(12) United States Patent
Kwak et al.

(10) Patent No.: US 10,725,644 B2
(45) Date of Patent: Jul. 28, 2020

(54) METHOD AND APPARATUS FOR CONTROLLING SCROLLING ON TERMINAL, AND COMPUTER-READABLE RECORDING MEDIUM THEREOF

(71) Applicant: NAVER BUSINESS PLATFORM Corp., Seongnam-Si, Gyeonggi-Do (KR)

(72) Inventors: Tae Yeong Kwak, Seongnam-si (KR); Dong Wook Kim, Seongnam-si (KR); Yoon Shick Lee, Seongnam-si (KR)

(73) Assignee: Naver Corporation, Seongnam-si (KR)

( * ) Notice: Subject to any disclaimer, the term of this patent is extended or adjusted under 35 U.S.C. 154(b) by 623 days.

(21) Appl. No.: 14/225,719

(22) Filed: Mar. 26, 2014

(65) Prior Publication Data

US 2014/0317492 A1 Oct. 23, 2014

(30) Foreign Application Priority Data

Apr. 22, 2013 (KR) .................. 10-2013-0043901

(51) Int. Cl.
*G06F 17/00* (2019.01)
*G06F 3/0485* (2013.01)
*G06F 3/0488* (2013.01)
*G06F 40/14* (2020.01)

(52) U.S. Cl.
CPC .......... *G06F 3/0485* (2013.01); *G06F 3/0488* (2013.01); *G06F 40/14* (2020.01)

(58) Field of Classification Search
CPC .......... G06F 17/30873; G06F 17/0485; G06F 3/0485; G06F 3/0488; G06F 3/0416; G06F 3/0412; G06F 40/14; G06F 40/00

USPC ........................................................ 715/234
See application file for complete search history.

(56) References Cited

U.S. PATENT DOCUMENTS

| | | | | |
|---|---|---|---|---|
| 2004/0150630 | A1* | 8/2004 | Hinckley | G06F 3/0418 345/173 |
| 2010/0223257 | A1* | 9/2010 | Milic-Frayling | G06F 17/30867 707/722 |
| 2010/0225604 | A1* | 9/2010 | Homma | G06F 3/0414 345/173 |
| 2010/0305695 | A1 | 12/2010 | Devonec | |

FOREIGN PATENT DOCUMENTS

| | | |
|---|---|---|
| JP | 2009-047809 A | 3/2009 |
| JP | 2010211399 A | 9/2010 |
| JP | 201273719 | 4/2012 |

(Continued)

OTHER PUBLICATIONS

Korean Office Action dated Oct. 31, 2014 for corresponding Korean Application No. 10-2013-0043901.

(Continued)

*Primary Examiner* — Laurie A Ries
(74) *Attorney, Agent, or Firm* — Harness, Dickey & Pierce, P.L.C.

(57) ABSTRACT

A method and apparatus for controlling a jump/scroll event on a terminal includes receiving a touch signal. The touch signal indicates at least one performed gesture; determining that a jump/scroll event has occurred when the performed gesture is substantially similar to at least one candidate gesture; and orienting a document to at least one jump/scroll position based on the determining.

20 Claims, 6 Drawing Sheets

(56) References Cited

FOREIGN PATENT DOCUMENTS

| | | |
|---|---|---|
| JP | 2012173842 A | 9/2012 |
| KR | 2008-0024472 A | 3/2008 |
| KR | 2010-0071423 A | 6/2010 |
| WO | WO-2012001872 A1 | 1/2012 |

OTHER PUBLICATIONS

Office Action for corresponding Japanese Application No. 2014-0871199 dated Mar. 31, 2015.
Japanese Office Action dated Dec. 8, 2015 for corresponding Japanese Application No. 2014-087199.

* cited by examiner

FIG. 5

```
                 (0,0)
<DIV CLASS="jump-index">
 <H2>NEWS</H2>
    .
    .
    .
 </DIV>     (0,100)
<DIV CLASS="jump-index">
 <H2>WEB DOCUMENT</H2>
    .
    .
    .
 </DIV>     (0,180)
<DIV CLASS="jump-index">
 <H2>IMAGE</H2>
    .
    .
    .
 </DIV>     (0,300)
<DIV CLASS="jump-index">
 <H2>BLOG</H2>
    .
    .
    .
 </DIV>   (0,500)
</BODY>
</HTML>
```

METHOD AND APPARATUS FOR CONTROLLING SCROLLING ON TERMINAL, AND COMPUTER-READABLE RECORDING MEDIUM THEREOF

RELATED APPLICATIONS

This application claims the benefit of Korean Patent Application No. 10-2013-0043901, filed on Apr. 22, 2013, in the Korean Intellectual Property Office, the disclosure of which is incorporated herein in its entirety by reference.

BACKGROUND

1. Field

One or more example embodiments relate to methods of controlling scrolling on a terminal, and more particularly, to a method and apparatus for controlling scrolling on a terminal, which are capable of moving to a desired position in a document, based on the direction, speed, and/or distance of a trajectory of a touch gesture performed for scrolling through a document, and a computer-readable recording medium thereof.

2. Description of the Related Art

Today, widespread propagation of the Internet has led to rapid development of wireless mobile communication technology. Information can be searched for via the Internet on a mobile terminal, such as mobile phone, a personal digital assistant (PDA), a hand-held computer, a tablet, a wearable computing device, and the like, with little or no regard to time and location. The mobile terminal is a general term of intelligent mobile phones or communication devices having a computer support function. The mobile terminal may include multiple functions, such as a PDA function, an internet function, a video capture and reproduction function, and other like functions. Mobile terminals may employ various input devices, such as a touch screen, a voice capture device, a motion capture device, and/or other like input devices. Also, a mobile terminal may support a wireless Internet function and is capable of being connected to the Internet and a computer so as to perform terminal functions such as emailing, web browsing, faxing, banking, playing games, and the like. As described above, a number of users who perform web surfing or web browsing with a mobile phone having various functions is growing.

In particular, a mobile terminal can be used interactively and intuitively by simply touching a button or a graphics object displayed on a touch screen of the mobile terminal with a finger, a pen, or a stylus. Thus, an input operation may be simplified and input data displayed on the touch screen may be more easily recognized to increase the precision of an input operation. Since the touch screen may be installed integrally with a display device, an installation space of a keypad may be saved and a display device with a larger visible screen may be employed in the mobile terminal.

However, even if a touch screen is employed in a mobile terminal, the touch screen may be smaller than a general display device, such as a computer monitor, and may not be able to display some or all information provided through web surfing or web browsing, which would normally be displayed on a general display device. In order to solve this problem, a scroll function is typically used.

However, conventionally, scrolling is performed based on the speed at which a user is manipulating a touch screen, but it is actually difficult and sometimes impossible for the user to input an exact speed for moving to a desired position. Also, since scrolling is typically performed in predetermined units, a user may not precisely and/or exactly move to a desired position by simply scrolling once. Thus, the user will be inconvenienced since the user has to repeatedly handle a touch screen of a mobile device so as to move to the desired position.

In order to solve problems of a conventional scroll control method, there is a need to develop a method of exactly moving to a desired position on a document, web page, or other like collection of data by scrolling once.

SUMMARY

At least one example embodiment relates to a method and apparatus for controlling a jump/scroll event on a terminal.

According to an example embodiment, a method of controlling a jump/scroll event on a terminal is provided. The method includes receiving a touch signal. The touch signal indicates at least one performed gesture. The method includes determining that a jump/scroll event has occurred when the performed gesture is substantially similar to at least one candidate gesture. The method includes orienting a document to at least one jump/scroll position based on the determining.

Example embodiments provide that the method further includes analyzing the document to detect the at least one jump/scroll position in the document.

Example embodiments provide that the analyzing includes detecting at least one mark contained in the document, and storing a location value associated with the at least one mark as the at least one jump/scroll position.

Example embodiments provide that the at least one mark includes at least one tag provided in one of hypertext markup language (HTML) Extensible Markup Language (XML), and Extensible Hypertext Markup Language (XHTML).

Example embodiments provide that the analyzing includes inserting at least one mark into the document, and storing a location value associated with the at least one mark as the at least one jump/scroll position.

Example embodiments provide that the determining includes determining that the jump/scroll event occurs by comparing a value with a threshold, the value being calculated based on the received touch signal.

Example embodiments provide that the method further includes determining a touch direction from the received touch signal, and determining that the jump/scroll event occurs when the determined touch direction has a similar direction as a desired scrolling direction.

Example embodiments provide that the calculated value includes at least one of a speed of the received touch signal, a distance of the received touch signal, and a pressure of the received touch signal.

Example embodiments provide that the threshold includes a plurality of threshold values, each of the plurality of threshold values corresponding to a position within the document.

Example embodiments provide that the orienting includes determining a location value of a new jump/scroll position by comparing a location value of a current position in the document with a location value of the at least one jump/scroll position in the document, and orienting to the new jump/scroll position in the document.

Example embodiments provide that storing the location value of the new jump/scroll position as the location value of the current position after the moving to the new jump/scroll position.

Example embodiments provide that the orienting to the jump/scroll position further includes storing the location value of the new jump/scroll position as the location value of the current position after the moving to the new jump/scroll position.

Example embodiments provide that the method further includes determining a touch behavior based on the received touch signal, and adjusting the threshold based on the determined touch behavior.

Example embodiments provide that the adjusting the threshold is based on at least one of a first reaction and a second reaction. The first reaction including a first other touch signal that indicates a performed gesture that is not substantially similar to the candidate gesture. The touch signal of the first reaction is received in a first touch direction that has an opposite direction than a second touch direction. The first reaction occurs within a first time period after the jump/scroll event occurs in the first touch direction. The second reaction including a second other touch signal. The second reaction being received in the first touch direction. The second reaction occurring within a second time period after the first other touch signal is received in the first touch direction.

Example embodiments provide that the received touch signal may indicate the at least one performed gesture and at least one gesture related criterion, and the determining further includes determining that the jump/scroll event has occurred when the performed gesture is substantially the same as the at least one candidate gesture and the at least one gesture related criterion is substantially the same as at least one candidate gesture related criterion.

According to another example embodiment, an apparatus for controlling a jump/scroll event on a terminal is provided. The apparatus includes an input unit configured to receive a touch signal. The apparatus includes a display unit configured to display at least one received document. The apparatus includes a scroll processor configured to orient the at least one received document to at least one jump/scroll position based on the received touch signal. The touch signal indicates at least one performed gesture. The scroll processor includes a touch signal analysis module configured to determine that a jump/scroll event has occurred when the performed gesture is substantially the same as at least one candidate gesture. The scroll processor includes a document movement module configured to orient the at least one received document to the at least one jump/scroll position based on the determining.

Example embodiments provide that the scroll processor further includes a document analysis module configured to analyze the at least one received document to detect the at least one jump/scroll position in the document.

Example embodiments provide that the touch signal analysis module is further configured to determine that the jump scroll event has occurred by comparing a value calculated from the received touch signal with a threshold.

Example embodiments provide that the scroll processor further includes a behavior analysis module configured to determine a touch behavior based on the received touch signal, and a threshold adjustment module configured to adjust the threshold based on the determined touch behavior.

Example embodiments provide that the threshold adjustment module is configured to adjust the threshold based on at least one of a first reaction and a second reaction. The first reaction including a first other touch signal that indicates a performed gesture that is not substantially similar to the candidate gesture. The first other touch signal is received in a first touch direction opposite to a second touch direction. The first reaction occurring within a first time period after the jump/scroll event occurs in the first touch direction. The second reaction including a second other touch signal. The second reaction being received in the first touch direction. The second reaction occurring within a second time period after the first other touch signal is received in the first touch direction.

According to another example embodiment, a non-transitory computer-readable recording medium having recorded thereon a program that, when executed by a processor, performs a function of receiving a touch signal indicating at least one performed gesture; determining that a jump/scroll event has occurred when the performed gesture is substantially the same as at least one candidate gesture; and orienting a document to at least one jump/scroll position based on the determining.

According to another example embodiment, a method of controlling an orientation of a document on a terminal is provided. The method includes orienting a document from a first position to a second position based on a received touch signal. The received touch signal indicates that a jump/scroll event has occurred when the jump/scroll event is substantially the same as at least one candidate gesture.

A program for performing a method of controlling scrolling according to the one or more aspects of the present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

BRIEF DESCRIPTION OF THE DRAWINGS

These and/or other aspects will become apparent and more readily appreciated from the following description of the embodiments, taken in conjunction with the accompanying drawings in which:

FIG. 5 illustrates source code of a document displayed on a mobile terminal, according to an example embodiment;

DETAILED DESCRIPTION

Figure 1:
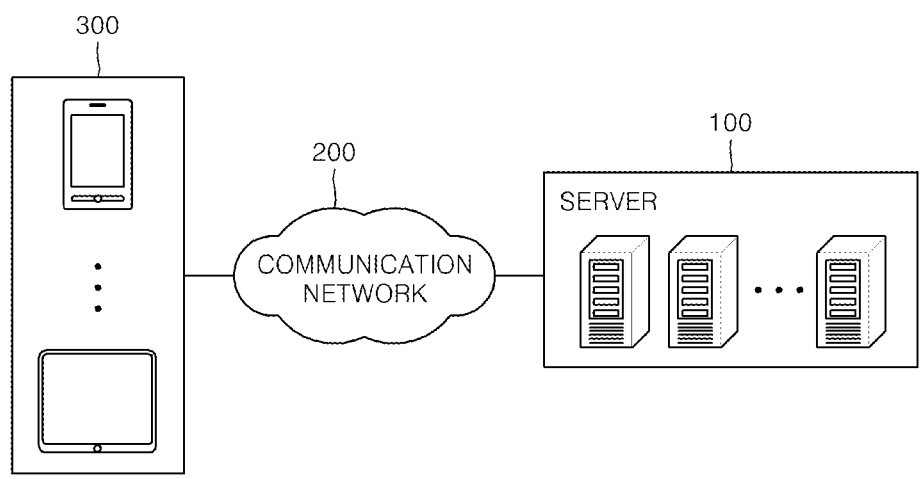
FIG. 1 is a diagram schematically illustrating the structure of an entire system including a mobile terminal having a scroll control function, according to an example embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein the term "and/or" includes any and all combinations of one or more of the associated listed items. Other words used to describe the relationship between elements or layers should be interpreted in a like fashion (e.g., "between" versus "directly between," "adjacent" versus "directly adjacent," "on" versus "directly on").

It will be understood that, although the terms "first", "second", etc. may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Example embodiments are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments should not be construed as limited to the particular shapes of areas illustrated herein but are to include deviations in shapes that result, for example, from manufacturing. For example, an implanted area illustrated as a rectangle will, typically, have rounded or curved features and/or a gradient of implant concentration at its edges rather than a binary change from implanted to non-implanted area. Likewise, a buried area formed by implantation may result in some implantation in the area between the buried area and the surface through which the implantation takes place. Thus, the areas illustrated in the figures are schematic in nature and their shapes are not intended to illustrate the actual shape of an area of a device and are not intended to limit the scope of example embodiments.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Reference will now be made in detail to example embodiments, which are illustrated in the accompanying drawings, wherein like reference numerals refer to like elements throughout. These example embodiments are fully described so that those of ordinary skill in the art can accomplish the example embodiments. It should be construed that various example embodiments are different from each other but need not be exclusive from one another. For example, the shapes, structures, and features of layers and regions illustrated in the drawings and described in the present disclosure may be different in other embodiments without departing from the spirit and scope of the example embodiments. Also, the location and arrangement of each element described in various embodiments may be modified without departing from the spirit and scope of the example embodiments. The example embodiments set forth herein should be considered in descriptive sense only and not for purposes of limitation. Therefore, the scope of the example embodiments are defined only by the appended claims and their equivalents provided that it is appropriately described.

In this disclosure, the expression 'jump/scroll event' is a broad concept of an event of moving to a particular position on a document set by a user among the user's various touch gestures sensed by sensors included in a touch screen, and is distinguished from a general scroll gesture.

Hereinafter, example embodiments will be described in greater detail with reference to the accompanying drawings.

Structure of the System

FIG. 1 is a diagram schematically illustrating the structure of a system including a mobile terminal having a scroll control function, according to an example embodiment.

As illustrated in FIG. 1, in the system according to an example embodiment includes a server 100 connected to at least one mobile terminal 300 (hereinafter referred to as "mobile terminal 300") via a communication network 200.

According to various embodiments, server 100 may include a physical computer hardware system that is configured to provide services for client devices (e.g., mobile terminal 300) connected to a network (e.g., communication network 200). Server 100 may employ one or more connection-oriented protocols such as Session Initiation Protocol (SIP), HTTP, and TCP/IP, and includes network devices that use connectionless protocols such as User Datagram Protocol (UDP) and Internet Packet Exchange (IPX). Server 100 may be configured to establish, manage, and terminate communications sessions, for example between the server 100 and one or more of mobile terminals 300. Server 100 may also be configured to establish, manage, and terminate communications sessions with two or more client devices.

According to various embodiments, server 100 may be connected to, or otherwise associated with one or more databases (not shown). The one or more databases may be any collection and/or organization of data residing on one or more data storage devices. The one or more data storage devices may be any computer readable medium such as solid state drives, storage area network (SAN) devices, network-attached storage (NAS) devices, local hard drives, optical data disks, magnetic storage, flash memory, and/or other like data storage devices. Furthermore, the one or more databases may include one or more virtual machines, such that the physical data storage devices containing the one or more databases may be logically divided into multiple virtual data storage devices and/or databases. Alternatively, each of the one or more databases may reside on one physical hardware data storage device. In various embodiments, the one or more databases may include a database management system ("DBMS"). The one or more databases may include a relational database management system ("RDBMS") database. In other embodiments, alternate DBMS may also be used, such as an object database ("ODBMS"), column-oriented DBMS, correlation database DBMS, and the like. In various embodiments, the one or more databases may collect and/or store jump/scroll information and/or other touch signal related data for providing jump/scroll related services.

In various example embodiments, the server 100 receives a request to transmit a desired document from the mobile terminal 300, extracts the document, and transmits the document to the mobile terminal 300. Here, the request to transmit the desired document may be made by inputting or transmitting a uniform resource locator (URL) using an application including a web browser function included in the mobile terminal 300. The transmitted document may be a web page that has source code including a particular mark and/or tag that, when designated and/or inserted into the transmitted document, allows the document to be oriented at or around a desired position in the document when a jump/scroll event occurs. The server 100 may further include a function of providing a particular application for controlling scrolling through the document based on a user input received from the mobile terminal 300. In such embodiments, the application is installed in the mobile terminal 300, and the application controls scrolling to a desired position in the document based on whether a jump/scroll event occurs.

A function of providing a document and the function of providing the particular application may be physically embodied in one or more devices, or a plurality of machines having the same function may be physically installed in parallel. As described above, it would be apparent to those of ordinary skill in the art that the example embodiments are not limited by the physical number and location of machines having various functions or the physical number of location of databases and may be embodied and modified in various ways.

According to an example embodiment, the communication network 200 may be configured regardless of a communication type, (e.g., a wired type and/or a wireless type), and may be embodied as various communications networks, such as a personal area network (PAN), a local area network (LAN), a metropolitan area network (MAN), a wide area network (WAN), and/or other like communications networks. The communication network 200 may be the World Wide Web (WWW), and use a wireless transfer technology, (e.g., infrared data association (IrDA), Bluetooth, and/or the like).

According to various embodiments, mobile terminal 300 may be any hardware computing device capable of providing communications services via a cellular network, computer network, and/or other like communications network (e.g., communication network 200). In various embodiments, mobile terminal 300 may be capable of communicating with a server (e.g., server 100), such that the mobile terminal 300 is able to receive services from the server. Mobile terminal 300 may include memory, one or more processors, and a transceiver. Mobile terminal 300 may be configured to send/receive data to/from network devices, such as a router, switch, or other like network devices. Mobile terminal 300 may be designed to sequentially and automatically carry out a sequence of arithmetic or logical operations; equipped to record/store digital data on a machine readable medium; and transmit and receive digital data via one or more network devices. Mobile terminal 300 may include a wireless transceiver configured to operate in accordance with wireless communications standard. The term "mobile terminal", "mobile device", "client device", and the like, as used herein, may refer to any hardware computing device having portability or mobility, such as a smart phone, a laptop computer, a digital broadcasting terminal, video cameras, digital photo cameras, an MP3 player, a tablet PC, a portable medial player (PMP), navigation device, a wearable computing device, and/or any logical device capable of capturing/recording, storing, and/or transferring data via a communications network.

In one example embodiment, the mobile terminal 300 includes an input/output device having a function of connecting to the server 100 via the communication network 200, such that the mobile terminal 300 may receive a response to the request to transmit the desired document from the user. The mobile terminal 300 may also include a touch screen. The mobile terminal 300 may also include an application that controls scrolling on the touch screen. The mobile terminal 300, while running the application, may determine that a user input is a jump/scroll event while a document is being displayed, and may scroll and/or jump to a desired (or alternatively, "predetermined") position in the displayed document.

Additionally, according to various embodiments, any number of client devices, multiple servers, and/or multiple databases may be present. Additionally, in some embodiments, advertising server 100 and any associated databases may be virtual machines, may reside on one or more hardware device, and/or may be provided as part of a cloud computing service.

Structure of Mobile Terminal

Figure 2:
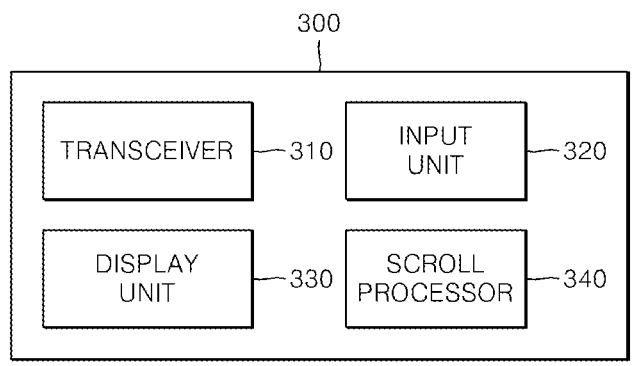
FIG. 2 is a block diagram of a mobile terminal according to an example embodiment.

FIG. 2 is a block diagram of a mobile terminal 300 according to an example embodiment. Referring to FIG. 2, the mobile terminal 300 may include a transceiver 310, an input unit 320, a display unit 330, and a scroll processor 340.

Referring to FIGS. 1 and 2, the mobile terminal 300 includes a transceiver 310, which may be any device capable of transmitting and receiving radio waves and/or data signals. In various embodiments, the transceiver 310 is a single device including a transmitter and receiver. In other embodiments, the transceiver 310 may include a transmitter and receiver that are logically grouped together as a single unit. The mobile terminal 300 may request, via the transceiver 310, the server 100 to transmit a desired document via the communication network 200, and the mobile terminal 300 may receive the requested document via the transceiver 310. The mobile terminal 300 displays the document on the display unit 330. Also, the transceiver 310 may further include a function of receiving an application for performing a function of the scroll processor 340 for installation.

Input unit 320 may be a computer hardware device that provides data and/or control signals to an information processing device (e.g., scroll processor 340). In various embodiments, a touch screen may be used as the input unit 320. in such embodiments, a user may select a desired function or receive desired information via the input unit 320. The touch screen used as the input unit 320 includes a sensor capable of sensing a change in pressure and/or a physical state (e.g., a resistance, an electrostatic capacitance, and the like), caused by a user's touch and/or gesture. The input unit 320 outputs a touch signal to the scroll processor 340 when a user's touch gesture is sensed.

Display unit 330 is an output device that presents visual information. The display unit 330 displays a document received via the transceiver 310. When the scroll processor 340 senses the jump/scroll event, the display unit 330 may move to a desired position within the document, or the display unit 330 may orient the document such that the document is displayed at the desired position. When the mobile terminal 300 uses a touch screen, the input unit 320 and the display unit 330 may be the same.

Scroll processor 340 is a hardware device that carriers out arithmetic, logical, and input/output operations for performing jump/scroll related processes. The scroll processor 340 analyzes a document received from the transceiver 310 to determine a position to move or otherwise orient to in the document when a jump/scroll event occurs. When a touch signal is received via the input unit 320, the scroll processor 340 analyzes the touch signal to determine whether the touch signal is a jump/scroll event, and moves to a desired position within the document when the touch signal is determined to be a jump/scroll event. Also, the scroll processor 340 may analyze a user's behavior and adjust a threshold to be used to determine whether the jump/scroll event has occurred. The functions of the scroll processor 340 will be described with reference to FIG. 3 below.

Structure of Scroll Processor

Figure 3:
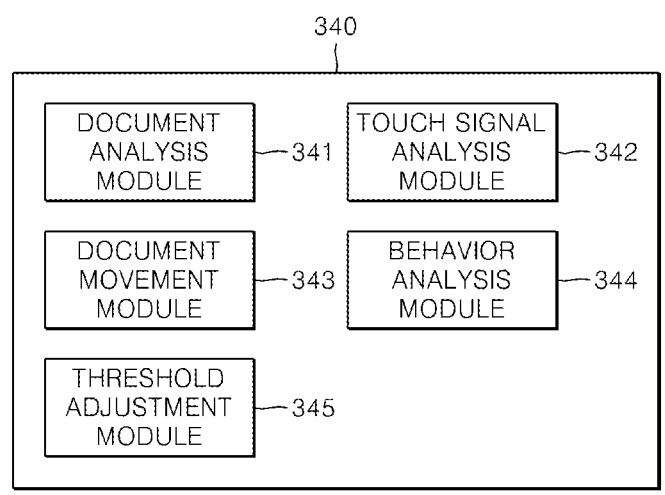
FIG. 3 is a block diagram of a scroll processor according to an example embodiment.

FIG. 3 is a block diagram of the scroll processor 340 according to an example embodiment. Referring to FIG. 3, the scroll processor 340 according to example embodiments includes a document analysis module 341, a touch signal analysis module 342, a document movement module 343, a behavior analysis module 344, and a threshold adjustment module 345. The document analysis module 341 analyzes a document transmitted to the transceiver 310 according to a request, and determines a position to move or otherwise orient to in the document when the jump/scroll event occurs. According to various embodiments, the document analysis module 341 detects preset marks by scanning the document from top to bottom, and calculates or otherwise determines location values of all marks included in the document. The preset marks may be various designated tags or arbitrary tags provided in Hypertext Markup Language (HTML), Extensible Markup Language (XML), Extensible Hypertext Markup Language (XHTML), and/or other like language for creating webpage documents, when the document is a web page. For example, when a heading tag such as <H1> or <H2> or a tag designating a region such as <div> are defined as a mark, the document analysis module 341 calculates or otherwise determines a location value of a position on the document indicated with the <H1>, <H2>, or <div> tag while scanning the entire document. Since basic tags may not fully reflect an intention of designating a position to move or otherwise orient to in the document when scrolling occurs by a document creator, 'ID' or 'CLASS' may be designated in a tag (e.g., <DIV CLASS="jump-index">), so that the document creator's intention of designating the position may be fully reflected. Otherwise, when use of arbitrary tags is allowed, arbitrary tags such as '<JUMPINDEX/>' may be designated and detected while the document analysis module 341 scans the entire document. Location values of positions to move or otherwise orient to in the document when the jump scroll event occurs, which are calculated or otherwise determined by analyzing the document by the document analysis module 341, may be horizontal and vertical location values on the document and stored in a storage space (not shown) in the mobile terminal 300. Furthermore, according to various embodiments, when a received document is not a webpage, the document analysis module 341 may analyze the document to identify formatting marks, font types and/or sizes, graphics, page breaks, and/or other like identifying features in order to calculate or otherwise determine location values within the document.

FIG. 5 illustrates source code of a document displayed on the mobile terminal 300, according to an example embodiment. Referring to FIG. 5, when a <DIV CLASS="jump-index"> tag is defined as a desired mark, the document analysis module 341 may calculate or otherwise determine location values (0, 0), (0, 100), (0, 180), and (0, 300) for each of the defined marks within the document of FIG. 5 while scanning the document, and store these location values as shown in Table 1 below.

TABLE 1

| | |
|---|---|
| First move position | (0, 0) |
| Second move position | (0, 100) |
| Third move position | (0, 180) |
| Fourth move position | (0, 300) |
| Ending move on document | (0, 500) |

When a touch signal is received via the input unit 320, the touch signal analysis module 342 analyzes the touch signal to determine whether the jump/scroll event has occurred. The jump/scroll event may be defined by a designated or otherwise determined gesture and/or action (i.e., a "candidate gesture") among various touch signals input by a user, or the jump/scroll event may be defined by one or more candidate gestures and/or combined with a gesture related criterion. A gesture may include scrolling, tapping, double tapping, long press, pinch open, pinch close, panning flicking, dragging, rotate, two-finger tapping, two-finger-scrolling, and/or other like touch signals. Additionally, a gesture related criterion may include holding a gesture for a desired period of time, performing a gesture in a desired position and/or in a desired direction, performing a combination of gestures in a desired sequence, performing a gesture before or after a desired condition is met, and/or other like gesture related criteria. It should be noted that, although examples of gestures, actions, and gesture related criteria have been described above, the example embodiments are not limited thereto and various other gestures and/or actions may be designated as a candidate gesture for a jump/scroll event.

Figure 6A:
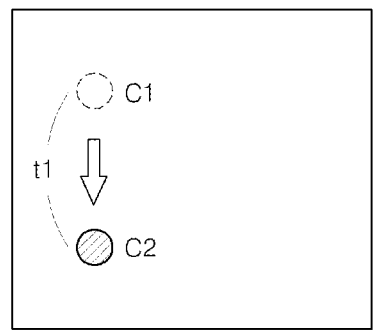
FIGS. 6A and 6B are diagrams for explaining scroll control functions of a mobile terminal, according to various embodiments of the present invention.

In various embodiments, when a flicking gesture is designated as the candidate gesture for the jump/scroll event, the touch signal analysis module 342 calculates the direction and speed of a touch gesture by using the location and time that the touch gesture ends and the location of a previous touch gesture performed at a desired time before the current touch gesture, based on a generated touch signal. Referring to FIG. 6A, when it is determined that a touch gesture ends at coordinates C2, the touch signal analysis module 342 calculates or otherwise determines a direction and speed of the touch gesture based on the coordinates C2 and coordinates C1. Coordinates C1 are the location of a previous touch gesture performed at a time t1 before the time that the touch gesture ends The direction of the touch gesture may be calculated or otherwise determined as the direction of a vector with the coordinates C1 as a starting position and the coordinates C2 as an ending position. The speed of the touch gesture may be calculated as a value obtained by dividing the size of the vector by the time t1. Otherwise, the direction of the touch gesture may be first calculated to determine whether the jump/scroll event has occurred. If the calculated direction of the touch gesture is the same as a scrolling direction, the touch signal analysis module 342 may compare the calculated speed of the touch gesture with a preset threshold and determine that the jump/scroll event occurs in the direction of the touch gesture when the calculated speed is equal to or greater than the preset threshold. Based on the determined speed and directions of the touch gesture, the signal analysis module 342 may instruct or otherwise indicate to the document movement module 343 to move or otherwise orient to a desired position on the document. If the calculated speed is less than the preset threshold, the touch gesture may be determined to be a general scroll gesture other than the jump/scroll event, and the scroll gesture may be processed.

Figure 6B:
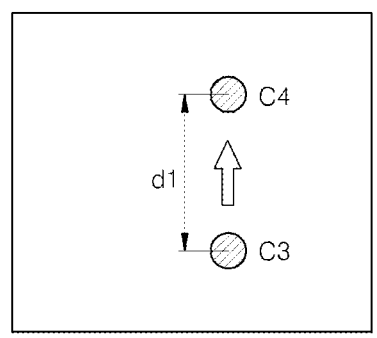

According to example embodiments, when a dragging gesture is designated as the candidate gesture for the jump/scroll event, the touch signal analysis module 342 calculates or otherwise determines the direction and distance of a touch gesture based on starting and ending positions of the touch gesture which are indicated in a generated touch signal. Referring to FIG. 6B, the touch signal analysis module 342 calculates or otherwise determines the direction and distance of a touch gesture, based on coordinates C3, which indicates where the touch gesture starts, and coordinates C4, which indicates where the touch gesture ends. The direction of the touch gesture may be calculated or otherwise determined to be the direction of a vector with the coordinates C3 as a starting position and the coordinates C4 as an ending position, and the distance of the touch gesture may be calculated or otherwise determined to be the size of the vector. The direction of the touch gesture may be first calculated to determine whether the touch signal is the jump/scroll event. The touch signal analysis module 342 may compare the calculated distance of the touch gesture with a threshold when the calculated direction of the touch gesture is the same or similar as the scrolling direction, determine that the jump/scroll event occurs in the direction of the touch gesture when the calculated distance is equal to or greater than the threshold, and instruct the document movement module 343 to move or otherwise orient to a desired position on the document. If the calculated distance is less than the preset threshold, the touch gesture is determined as a general scroll gesture other than the jump/scroll event and is then processed.

According to various embodiments, the term "scrolling direction" means a direction in which scrolling is performed through a document in a substantially vertical and/or horizontal direction. In this case, an error in an angle that falls within a desired range may be allowed. The speed and/or distance of the touch gesture by used for determining whether the jump/scroll event occurs, according to whether a desired action is designated as the candidate gesture for the jump/scroll event or not.

According to various embodiments, even if an input touch signal is determined to not be the jump/scroll event, touch information, including the direction and/or distance of a touch gesture, may be provided to the document movement module 343 in order to process a general scroll gesture.

According to various embodiments, the touch signal analysis module 342 may set a plurality of thresholds to determine whether the jump/scroll event has occurred, compare speeds or distances of touch gestures calculated in several stages with the plurality of thresholds, respectively, and instruct to move or otherwise orient to different positions on the document. For example, when a flicking gesture is designated as the candidate gesture for the jump/scroll event, a plurality of thresholds may be set as shown in Table 2 below to be used in several stages. If a calculated speed of a touch gesture is 2.5 cm/s, the touch gesture is determined to be the candidate gesture for the jump/scroll event and a position to move or otherwise orient to is a second next move position from a current position on a document. If the calculated speed of the touch gesture is 0.8 cm/s, the touch gesture may be determined to be a scroll gesture other than the candidate gesture for the jump/scroll event.

TABLE 2

| 1 cm/s | Next move position |
|---|---|
| 2 cm/s | Second move position |
| ... | ... |
| N cm/s | $N^{th}$ next move position |

The document movement module 343 receives information regarding the jump/scroll event and/or other touch information from the touch signal analysis module 342, and moves to a desired position or performs a scroll gesture, based on the received touch information. The information regarding the jump/scroll event may include a direction of a touch gesture, moving position information when a plurality of thresholds are used. The document movement module 343 determines a position to move or otherwise orient to in the document, based on a location value of the current position on the document that is currently displayed on the display unit 330 and location values of positions to move or otherwise orient to in the document, which are scanned by the document analysis module 341, when the jump/scroll event occurs, and allows the document to be displayed on the display unit 330 after moving to the determined position. In various embodiments, if there is no position to move or otherwise orient to in the document, the display unit 330 may display the document at the starting position or ending position on the document, based on the direction of the touch gesture. Also, the document movement module 343 stores a location value of a current position on the displayed document after moving to the determined position.

By way of example, if the touch information regarding the jump/scroll event indicates that a current position in a document has a location value (0, 120) and the direction of a touch gesture is a downward direction, then the document movement module 343 compares the location value (0, 120) of the current position with location values of positions to move or otherwise orient to, when the jump/scroll event occurs as illustrated in Table 1. The document movement module 343 determines a location value of a position to move or otherwise orient to next as (0, 180), displays the document on the display unit 330 after moving to the determined position, and updates and stores the location value of the current position on the displayed document as (0, 180).

According to various embodiments, if information regarding the jump/scroll event indicate that a current position on the document has a location value (0, 270) and the direction of a touch gesture is an upward direction, and indicate a second move position as moving position information is received, then the document movement module 343 compares the location value (0, 270) of the current position with the location values of the positions to move or otherwise orient to when the jump/scroll event occurs as illustrated in Table 1. The document movement module 343 then determines a location value of the second next move position in the upward direction to be (0, 100), displays the document on the display unit 330 after moving to the determined position, updates the location value of the current position on the document with the location value (0, 100), and stores the location value (0, 100).

In various embodiments, even if it is determined that an input touch signal is not the candidate gesture for the jump/scroll event, the document movement module 343 receives touch information, including the direction and distance of a touch gesture, to handle scroll gestures and/or other like gestures. When a scroll gesture has been received, a document may be scrolled through based on the direction and distance of the scroll gesture. The document movement module 343 may also store horizontal and vertical location values of a current position on the displayed document after a scrolling operation is performed.

The behavior analysis module 344 determines whether a desired threshold should to be adjusted by monitoring a result of the touch signal analysis module 342. Different touch signals may be input by users in order to perform the jump/scroll event. If a desired threshold that is to be used to determine whether the jump/scroll event has occurred is not adjusted, the jump/scroll event may be performed differently from some of the users' intentions. Thus, the behavior analysis module 344 determines whether the desired threshold is to be increased or decreased by monitoring the result of the touch signal analysis module 342, and determines a degree by which the desired threshold is to be increased or decreased when it is determined that the desired threshold is to be increased or decreased.

In various embodiments, if touch information other than the jump/scroll event occurs at a relatively high rate in a direction opposite to a particular touch direction within a short time after the jump/scroll event occurs in the particular touch direction (hereinafter, referred to as "first reaction"), maybe an indication that a user wants to return to a previous state. In such embodiments the jump/scroll event may still occur even though the user does not intend to perform the jump/scroll event. In this case, the desired threshold may be determined to be increased. In various embodiments, if the jump/scroll event and/or touch information other than the jump scroll event frequently occurs in a particular touch direction within a short time after touch information other than the jump scroll event occurs in the particular touch direction (hereinafter, referred to as "second reaction"), may be an indication that a user wants to move or otherwise orient to a desired position since the jump/scroll event. In such embodiments, the jump/scroll event may not occur even though the user intends to instruct to perform the jump/scroll event. In this case, the desired threshold may be determined to be decreased.

Figure 7:
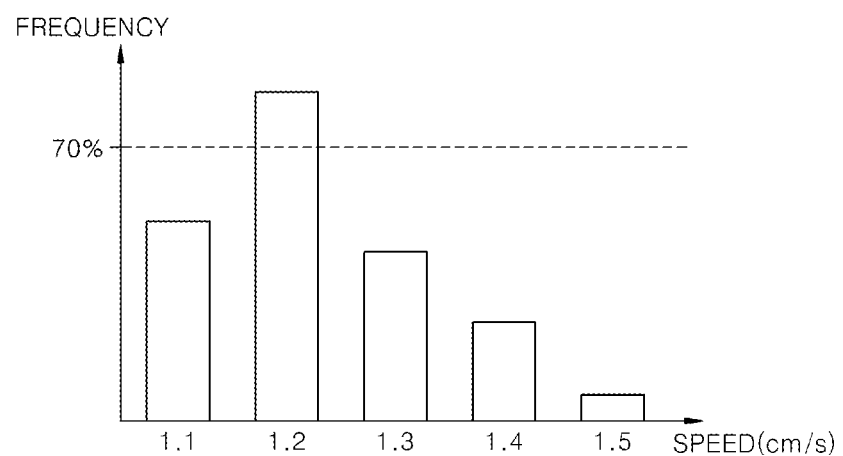
FIG. 7 is a graph that may be referred to adjust a threshold according to an example embodiment.

FIG. 7 is a graph showing a frequency and speed of the first reaction according to an example embodiment. Referring to FIG. 7, if a threshold of 1.0 cm/s is used to determine whether the jump/scroll event has occurred, the threshold may be determined to be adjusted when the frequency of the first reaction in a document section is a desired value or more than the threshold, such as 70% or more than the threshold, which would be at least 1.2 cm/s. The speed corresponding to this section may be set as a reference value for the threshold to be adjusted, and the threshold may be adjusted to be proportional to the reference value. According to various embodiments, when a number of times the first or second reaction occurs in a particular section is equal to or greater than a desired value, the threshold is determined to be adjusted. In this case, a speed corresponding to the particular section may be set to a reference value of the threshold to be adjusted, and the threshold may be adjusted to be proportional to the speed. Additionally, it will be apparent to those of ordinary skill in the art that the threshold may be adjusted under a combination of various conditions.

When the determination of the behavior analysis module 344 reveals that the desired threshold should to be adjusted, the threshold adjustment module 345 receives the desired threshold from the behavior analysis module 344 and adjusts the desired threshold. Referring to FIG. 7, the threshold adjustment module 345 may adjust 1.0 cm/s, which is the desired threshold, to either 1.2 cm/s, which is the speed corresponding to the section in which the frequency of the first reaction is 70%, or 1.1 cm/s, which is an average of these values.

Scroll Control Method

Figure 4:
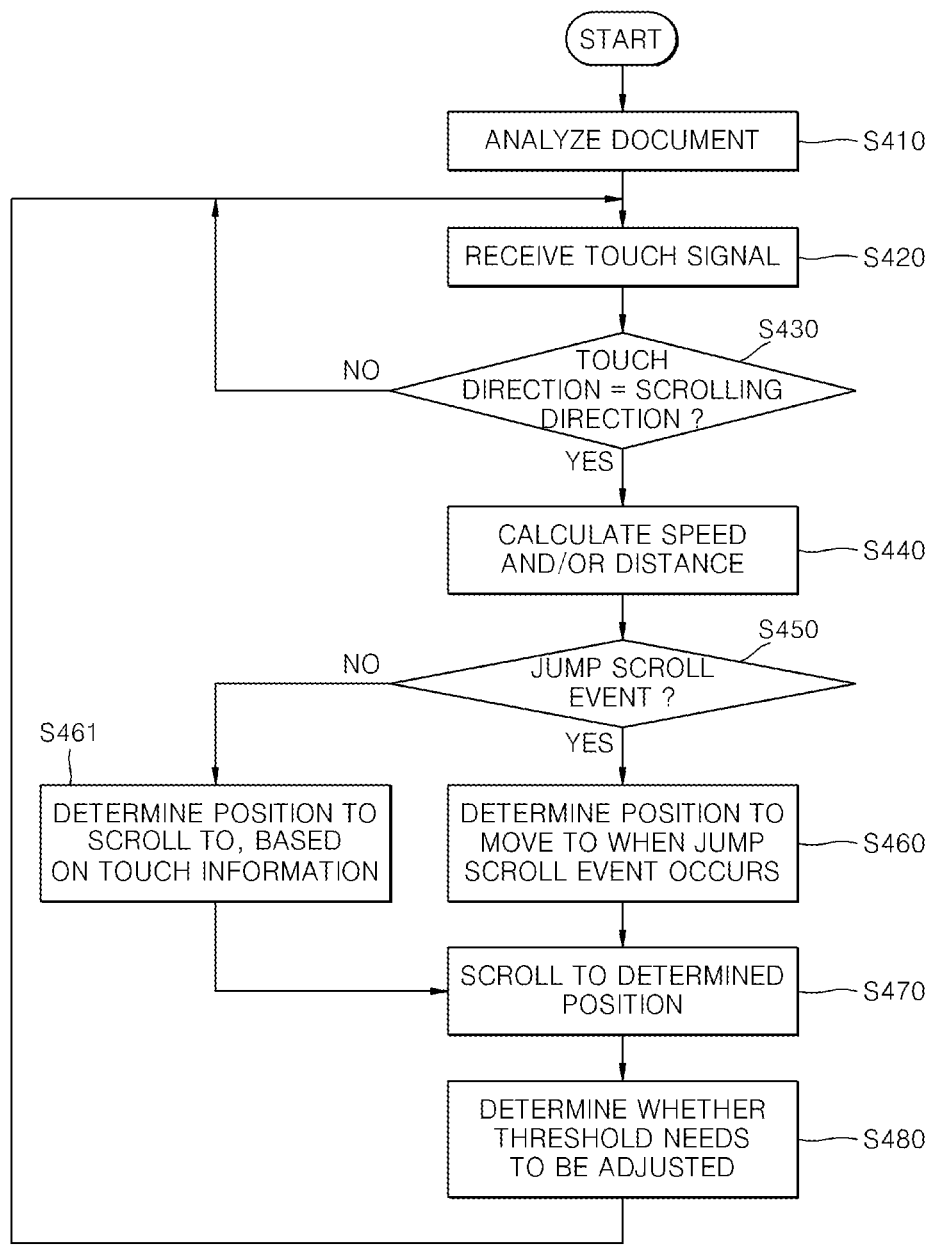
FIG. 4 is a flowchart of a scroll control method according to an example embodiment.

FIG. 4 is a flowchart of a scroll control method according to an example embodiment.

As shown in operation S410, the document analysis module 341 of the scroll processor 340 analyzes a received document to determine a position to move or otherwise orient to in the document beforehand when the jump scroll event occurs. When the document is analyzed in operation S410, desired marks may be detected by scanning the document from top to bottom, and location values of all the marks in the document may be calculated and stored as described above. Then, as shown in operation S420, when a touch signal is received via the input unit 320, the touch signal analysis module 342 calculates a touch direction based on the touch signal.

As shown in operation S430, the touch signal analysis module 342 determines whether the calculated touch direction is the same as a scrolling direction (i.e., whether the touch signal input by a user means that scrolling is to be performed). If it is determined that the touch direction is the same or similar as the scrolling direction in operation S430, the touch signal analysis module 342 proceeds to operation S440 to calculate a speed and/or a distance based on the touch signal according to the jump/scroll event.

Although FIG. 4 illustrates that the calculation of the touch direction and the calculation of the speed and/or the distance are performed in different operations, according to various embodiments, the speed and distance may be performed simultaneously.

As shown in operations S450, the touch signal analysis module 342 determines whether the touch signal input by the user corresponds to the jump/scroll event based on the calculated speed and/or distance. As described above, the determination may be performed by comparing the calculated speed and/or distance with a desired threshold.

If the touch signal analysis module 342 determines in operation S450 that the touch signal from the user corresponds to the jump scroll event, the document movement module 343 proceeds to operations S460 to determine a position to move or otherwise orient to by comparing a current position on a document displayed on the display unit 330 with the position to move or otherwise orient to when the jump/scroll event occurs, as determined in operation S410. As described above, a location value of the position to move or otherwise orient to may be calculated as a result of determination performed in operation S460. If the touch signal analysis module 342 determines in operation S450 that the touch signal does not correspond to the jump/scroll event, the document movement module 343 proceeds to operation S461 to receive a touch information including a touch direction and distance to determine a position to scroll through the document in order to handle a general scroll gesture according to a user's intention.

As shown in operation S470, the document movement module 343 moves the document to the position determined in operation S460 or S461. In some embodiments, the document movement module 343 may scroll to the determined position in the document. In such embodiments, the document movement module 343 may store a current location value of the moved document displayed on the display unit 330.

As shown in operation S480, the behavior analysis module 344 determines whether a desired threshold should be adjusted by monitoring a result of the determination of the touch signal analysis module 342 based on the touch signal from the user, and adjusts the desired threshold when it is determined that the desired threshold should to be adjusted. As described above, whether the desired threshold should be adjusted may be determined based on a frequency and/or a number of times of the first or second reaction is determined to be equal to a desired value or more than the desired value. In this case, a criterion for adjusting the desired threshold may be determined to be proportional to a section in which the frequency or the number of times is the desired value or more.

A method according to an example embodiment may be written as program commands executable via any computer means and recorded in a computer-readable recording medium. The computer-readable recording medium may include a program command, a data file, and a data structure solely or in combination. The program commands recorded in the computer-readable recording medium may be specifically designed and configured for one or more of the example embodiments, or may be well known to and usable by one of ordinary skill in the art of computer software. Examples of the computer-readable recording medium include magnetic media (e.g., hard disks, floppy disks, and magnetic tapes), optical media (e.g., CD-ROMs and DVDs), magneto-optical media (e.g., floptical disks), and hardware devices specifically configured to store and execute program commands (e.g., ROMs, RAMs, and flash memories). Examples of program commands include not only machine language codes prepared by a compiler, but also high-level language codes executable by a computer by using an interpreter. The hardware devices may be configured to operate as at least one software module to perform operations of the method, or vice versa.

The example embodiments have been described above with respect to particular functions and the purpose of operations of a method resulting in the performance of a relationship between the particular functions. Here, orders of such functional elements and the operations of the method are arbitrarily defined for convenience of explanation. Alternatively, the orders may be differently defined, provided that the particular functions and relationship can be appropriately performed. Thus, the arbitrarily defined orders are within the scope and idea of the invention defined in the claims. Similarly, flowchart blocks may be arbitrarily defined here to describe certain important functions. For extended use, the orders of the flowchart blocks may be defined and the flowchart blocks also perform the important functions in this case, The orders and alternative definitions of functional elements and flowchart blocks are thus within the scope and idea of the invention defined in the claims.

Herein, the example embodiments may have been at least partially described using the terms related to at least one embodiment. The embodiments set forth herein are intended to describe the example embodiments and aspects, features, concept, and/or examples of the example embodiments. Physical embodiments of apparatuses, products, machines, and/or processes for accomplishing the example embodiments may cover the one or more aspects, features, concepts, and examples described herein with reference to the one or more embodiments set forth herein. Furthermore, in all the drawings, the embodiments may unify the same or similarly named functions, operations, modules, etc. to which the same or different reference numerals may be assigned. These functions, operations, and modules may be the same or similar functions, operations, and modules or may be different functions, operations, and modules.

As described above, although the example embodiments have been described with respect to specific matters, such as specific elements, embodiments, and drawings, they are not intended to limit the scope of the invention and only used for a better understanding of the invention. It will be understood by those of ordinary skill in the art that various changes in form and details may be made without departing from the spirit and scope of the invention as defined by the appended claims.

Accordingly, the technical concepts of the example embodiments are not limited to the example embodiments set forth herein, and the above example embodiments are to cover all modifications, equivalents, and alternatives falling within the scope of the invention.

What is claimed is:

1. A method of controlling a jump/scroll event on a terminal, the terminal including a touch screen, the method comprising:

receiving, by the terminal, a touch signal, the touch signal indicating at least one gesture performed on the touch screen;

analyzing, by the terminal, a document to calculate at least one jump/scroll position at which to orient the touch screen;

determining, by the terminal, that a jump/scroll event has occurred when the performed gesture corresponds to at least one candidate gesture from among a plurality of potential gestures, the determining including calculating the direction and speed of the received touch signal and generating results based on the calculated direction and speed and a desired threshold direction and speed; and orienting, by the terminal, the document to the at least one jump/scroll position based on the results of the determining and the analyzing.

2. The method of claim 1, wherein the analyzing comprises:
analyzing the document to detect the at least one jump/scroll position in the document.

3. The method of claim 2, wherein the analyzing comprises:
detecting at least one mark contained in the document; and
storing a location value associated with the at least one mark as the at least one jump/scroll position.

4. The method of claim 3, wherein the at least one mark comprises at least one tag provided in one of hypertext markup language (HTML) Extensible Markup Language (XML), and Extensible Hypertext Markup Language (XHTML).

5. The method of claim 2, wherein the analyzing comprises:
inserting at least one mark into the document; and
storing a location value associated with the at least one mark as the at least one jump/scroll position.

6. The method of claim 1, wherein the determining comprises:
determining that the jump/scroll event occurs by comparing a value with a threshold, the value being calculated based on the received touch signal.

7. The method of claim 6, further comprising:
determining a touch direction from the received touch signal; and
determining that the jump/scroll event occurs when the determined touch direction has a similar direction as a desired scrolling direction.

8. The method of claim 6, wherein the calculated value comprises at least one of a speed of the received touch signal, a distance of the received touch signal, and a pressure of the received touch signal.

9. The method of claim 6, wherein the threshold comprises a plurality of threshold values, each of the plurality of threshold values corresponding to a position within the document.

10. The method of claim 9, further comprising:
determining a touch behavior based on the received touch signal; and
adjusting the threshold based on the determined touch behavior.

11. The method of claim 10, wherein the adjusting the threshold is based on at least one of,
a first reaction, the first reaction including a first other touch signal that indicates a performed gesture that does not correspond to the candidate gesture, the first other touch signal being received in a first touch direction that has an opposite direction than a second touch direction, the first reaction occurring within a first time period after the jump/scroll event occurs in the first touch direction, and
a second reaction, the second reaction including a second other touch signal, the second reaction being received in the first touch direction, the second reaction occurring within a second time period after the first other touch signal is received in the first touch direction.

12. The method of claim 1, wherein the orienting comprises:
determining a location value of a new jump/scroll position by comparing a location value of a current position in the document with a location value of the at least one jump/scroll position in the document; and
orienting to the new jump/scroll position in the document.

13. The method of claim 12, wherein the orienting to the jump/scroll position further comprises:
storing the location value of the new jump/scroll position as the location value of the current position after the moving to the new jump/scroll position.

14. The method of claim 1, wherein the received touch signal indicates the at least one performed gesture and at least one gesture related criterion, and the determining further comprises:
determining that the jump/scroll event has occurred when the performed gesture corresponds to the at least one candidate gesture and the at least one gesture related criterion corresponds to at least one candidate gesture related criterion.

15. An apparatus for controlling a jump/scroll event, the apparatus comprising:
a touch screen configured to receive a touch signal and display at least one received document;
a memory having computer readable instructions stored thereon; and
at least one processor configured to execute the computer readable instructions to,
analyze the at least one received document to calculate at least one jump/scroll position at which to orient the touch screen,
orient the at least one received document to the at least one jump/scroll position based on the received touch signal, the touch signal indicating at least one gesture performed on the touch screen,
determine that a jump/scroll event has occurred when the performed gesture corresponds to at least one candidate gesture from among a plurality of potential gestures, the determination includes calculation of a direction and speed of the received touch signal and generation of results based on the calculated direction and speed and a desired threshold direction and speed, and
orient the at least one received document to the at least one jump/scroll position based on the results of the determining and the analyzing.

16. The apparatus of claim 15, wherein the analyzing further comprises:
analyzing the at least one received document to detect the at least one jump/scroll position in the document.

17. The apparatus of claim 15, wherein the at least one processor is further configured to determine that the jump scroll event has occurred by comparing a value calculated from the received touch signal with a threshold.

18. The apparatus of claim 15, wherein the at least one processor is further configured to:
determine a touch behavior based on the received touch signal; and
adjust the threshold based on the determined touch behavior.

19. The apparatus of claim 18, wherein the at least one processor is further configured to adjust the threshold based on at least one of:
a first reaction, the first reaction including a first other touch signal that indicates a performed gesture that does not correspond to the candidate gesture, the first other touch signal being received in a first touch direction opposite to a second touch direction, the first reaction occurring within a first time period after the jump/scroll event occurs in the first touch direction; and a second reaction, the second reaction including a second other touch signal, the second reaction being received in the first touch direction, the second reaction occurring within a second time period after the first other touch signal is received in the first touch direction.

20. A non-transitory computer-readable recording medium having recorded thereon computer readable instructions that, when executed by at least one processor, configures the at least one processor to:

receive a touch signal, a touch signal indicating at least one gesture performed on a touch screen;

analyze a document to calculate at least one jump/scroll position at which to orient the touch screen;

determine that a jump/scroll event has occurred when the performed gesture corresponds to at least one candidate gesture from among a plurality of potential gestures, the determination includes calculation of a direction and speed of the received touch signal and generation of results based on the calculated direction and speed and a desired threshold direction and speed; and orient the document to the at least one jump/scroll position based on the results of the determining and the analyzing.

* * * * *